(12) United States Patent
Okuyama et al.

(10) Patent No.: US 6,686,069 B1
(45) Date of Patent: Feb. 3, 2004

(54) MAGNETIC RECORDING MEDIUM WITH IMPROVED CONTROL LAYER

(75) Inventors: Chiaki Okuyama, Higashine (JP); Naoya Saitoh, Tendo (JP); Akira Kikuchi, Tendo (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 09/671,053

(22) Filed: Sep. 27, 2000

(30) Foreign Application Priority Data

Oct. 5, 1999 (JP) .......................................... 11-283987

(51) Int. Cl.[7] .............................. G11B 5/66; G11B 5/70
(52) U.S. Cl. ........................ 428/694 TS; 428/694 TM; 428/694 TP; 428/694 TC; 428/694 SG; 428/900
(58) Field of Search ................... 428/694 TS, 694 TM, 428/694 TP, 694 TC, 694 SG, 900; 204/192.1, 192.12, 192.2

(56) References Cited

U.S. PATENT DOCUMENTS

| | | | | |
|---|---|---|---|---|
| 4,677,032 A | * | 6/1987 | Robinson | 428/611 |
| 4,833,020 A | * | 5/1989 | Shiroishi et al. | 428/336 |
| 5,041,922 A | | 8/1991 | Wood et al. | 360/55 |
| 5,693,426 A | | 12/1997 | Lee et al. | 428/611 |
| 5,830,590 A | | 11/1998 | Gooch et al. | 428/694 |
| 5,870,260 A | | 2/1999 | Davies et al. | 360/113 |
| 5,991,126 A | * | 11/1999 | Hayashi et al. | 360/125 |
| 6,218,033 B1 | * | 4/2001 | Cao et al. | 428/694 T |
| 6,248,416 B1 | * | 6/2001 | Lambeth et al. | 428/65.3 |
| 6,335,103 B1 | * | 1/2002 | Suzuki et al. | 428/611 |
| 6,511,761 B1 | * | 1/2003 | Tanahashi et al. | 428/694 TS |

* cited by examiner

Primary Examiner—Holly Rickman
(74) Attorney, Agent, or Firm—Greer, Burns & Crain, Ltd.

(57) ABSTRACT

A magnetic recording medium includes a non-magnetic substrate, a first non-magnetic control layer disposed above the substrate, a soft magnetic layer disposed above the first control layer, and a second non-magnetic control layer disposed above the soft magnetic layer. A primary magnetic layer is disposed above the second control layer.

25 Claims, 7 Drawing Sheets

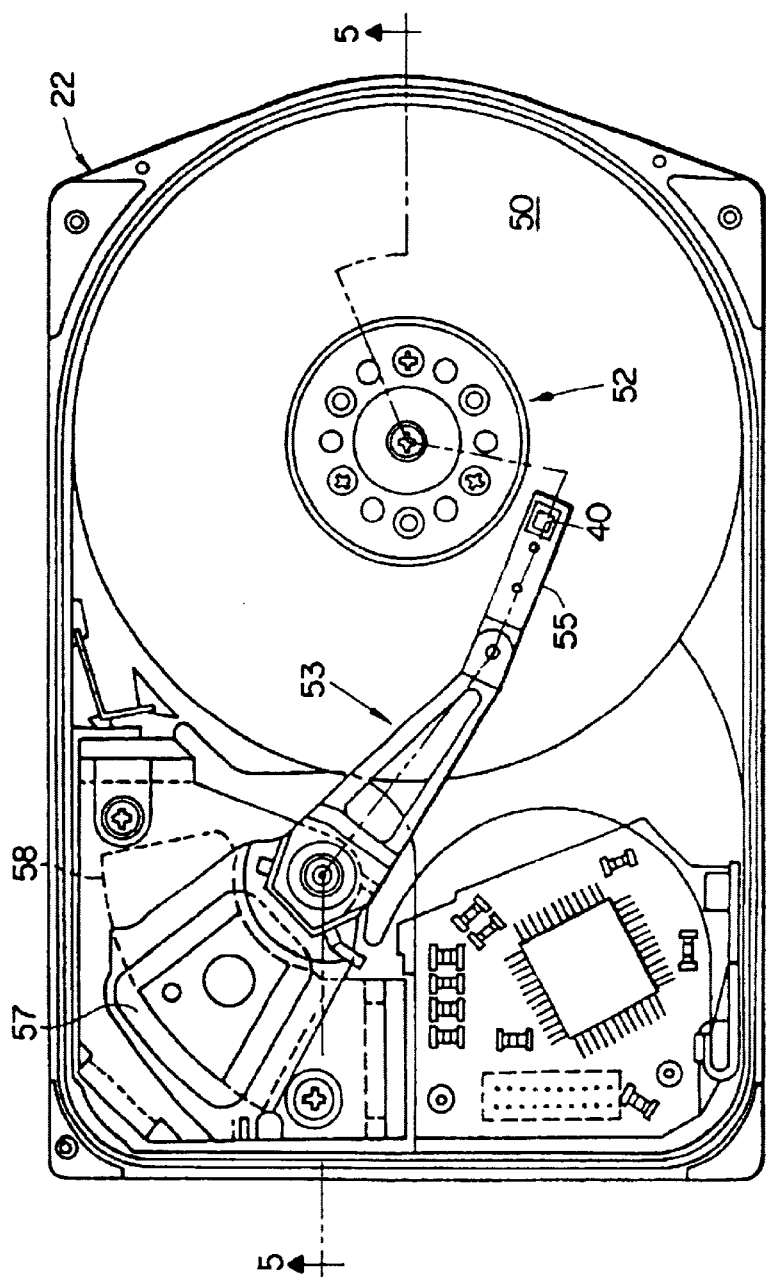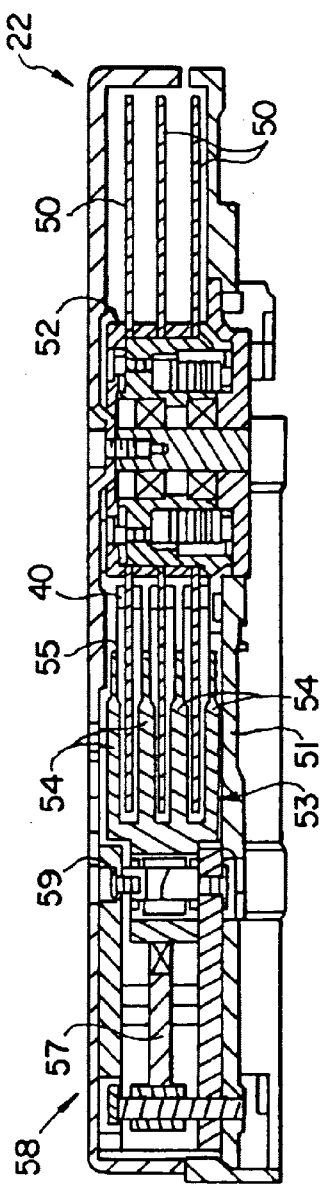

Thickness of the Cr-Mo secondary base layer

US 6,686,069 B1

MAGNETIC RECORDING MEDIUM WITH IMPROVED CONTROL LAYER

The present invention generally relates to a magnetic recording medium for a magnetic disk drive unit. More particularly, the present invention relates to the composition and positioning of a magnetic layer, a soft magnetic layer and control layers on a magnetic recording medium.

BACKGROUND

As data processing technology advances, magnetic disk drive units used as external storage devices for computers require larger capacities. For this reason, magnetic disks or recording media also must be capable of high density recording. High density recording has the benefit of producing high S/N ratios.

In in-plane magnetic recording media, it has become known that a reading waveform pulse width of Pw 50 creates the following relationships between the coercivity strength (Hc), saturation remanent magnetization (Mr), and the thickness of the magnetic layer (t), which are the magnetostatic properties of a recording medium:

$$a \propto (t \times Mr/Hc)^{1/2} \quad (1)$$

$$Pw\ 50 = (2(a+d)^2 + (a/2)^2)^{1/2} \quad (2)$$

Where d represents the magnetic spacing.

In simple terms, the narrower the pulse width, the better the medium is suited for high density recording. Therefore, to provide efficient high density recording, the smaller "a" is in the above equation, the better. To make "a" smaller, t and Mr must be as small as possible, and the coercivity (Hc) must be as large as possible.

Since reducing t and Mr of the magnetic layer also leads to a reduction in noise, demands for higher recording densities for magnetic recording medium have consistently been accompanied by demands to reduce t and Mr. However, as the t and Mr of the medium become smaller, thermal decay of magnetization occurs more easily, which creates a phenomenon where the signal level drops as time passes.

In order to prevent thermal decay, U.S. Pat. No. 5,041,922 to Wood et al. discloses a magnetic recording medium that uses a soft magnetic layer that possesses high magnetic permeability and is called a keeper layer. In this known medium, the soft magnetic or keeper layer is positioned either directly above or directly below the magnetic layer. Both of these layers rest on a non-magnetic substrate layer.

This configuration causes a mirror image of the bit pattern recorded on the magnetic layer to be formed on the keeper layer. The reverse magnetic field of the bit boundary will then be lowered by the recording condition, which stabilizes the magnetization. Stabilizing the magnetization also provides high resistance to thermal decay. A known keeper layer is also disclosed in U.S. Pat. Nos. 5,830,590 and 5,870,260. These patents disclose that signals are read by using magnetic heads to create a bias magnetic field and then saturating the keeper layer.

However, in these known magnetic recording medium with keeper layers, the S/N ratio is unacceptable when the keeper layer is placed above the magnetic layer because the distance between a magnetic head traveling above the medium and the magnetic layer is too far. In addition, when the keeper layer is placed below the magnetic layer, the in-plane orientation of the magnetic layer's C axis deteriorate so that the resolution is reduced when reading, which increases the noise. Moreover, known MR or GMR heads used for reproduction generate a magnetic field by using very small sensing currents that cannot adequately saturate the keeper layer. This also will make it very difficult to read signals.

For these reasons, a main object of the present invention is to provide an improved magnetic recording medium that is suitable for high density recording.

Another object of the present invention is to provide an improved magnetic recording medium with a high S/N ratio.

Yet another object of the present invention is to provide an improved magnetic recording medium with good in-plane orientation of the magnetic layer.

Still another object of the present invention is to provide a magnetic recording medium in which reading is possible using either a MR head or a GMR head.

Other objects or advantages of the present invention are discussed or will be apparent from the detailed description of the invention.

SUMMARY OF THE INVENTION

In one aspect of the present invention, a magnetic recording medium includes a non-magnetic substrate, a first non-magnetic control layer disposed above the substrate, a soft magnetic layer disposed above the first control layer, and a second non-magnetic control layer disposed above the soft magnetic layer. A primary magnetic layer is disposed above the second control layer.

BRIEF DESCRIPTION OF THE DRAWINGS

The above-mentioned, and other features of this invention and the manner of obtaining them will become apparent, and the invention itself will be best understood by referring to the following description of a preferred embodiment of the invention in conjunction with the drawings, in which:

FIG. 4 is a top view of a magnetic disk drive unit that uses the magnetic disk of the present invention;

FIG. 5 is a cross-sectional view taken along line 5—5 in FIG. 3;

DESCRIPTION OF THE PREFERRED EMBODIMENT

Figure 1:
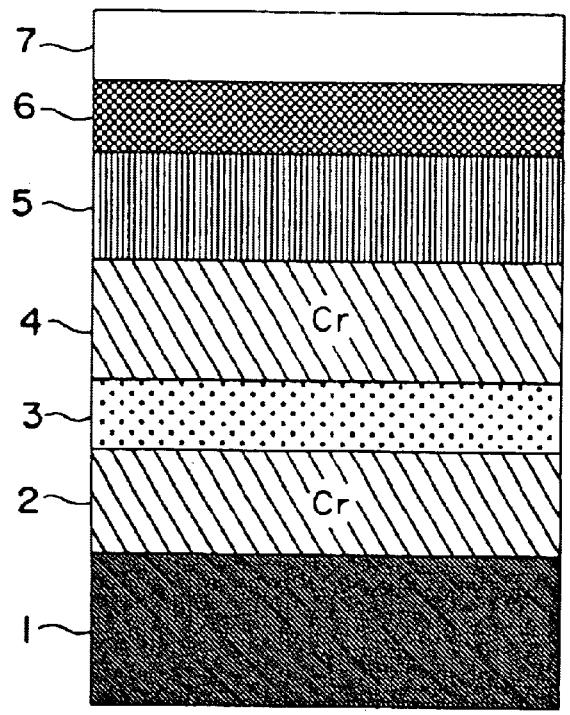
FIG. 1 is a cross-sectional view of the magnetic disk of the present invention.

The above-listed objects are met or exceeded by the present magnetic recording medium which has the following preferred configuration. Referring now to FIG. 1, a magnetic disk 10 has the following layers from bottom to top: a non-magnetic support (substrate) 1, a primary base layer or first control layer 2, a soft magnetic layer 3, a secondary base layer or second control layer 4, a magnetic layer 5, a protective layer 6 and an optional lubricating film 7.

The substrate 1 has a non-magnetic material with a round disk shape. The substrate 1 may include aluminum (including aluminum alloys) plated with NiP, glass (including reinforced glass), silicon with a plane oxide layer, SiC, carbon, plastic, and/or ceramic. The substrate 1, however, is preferably texture treated with NiP plating in the circumferential direction for permitting an increase in the in-plane orientation of the magnetic layer 5. The diameter of the substrate 1 depends on the type of medium desired and the type of magnetic disk drive. In general, the diameter is preferably 1 to 3.5 inches, with a thickness from 0.5 mm to 1.0 mm.

The first control layer or primary base layer 2 preferably includes a non-magnetic metal in which chromium or a chromium alloy is the main component. Usable chromium alloys include CrW, CrV, CrTi or CrMo. However, instead of chromium in the control layer 2, a B2 structure, such as that disclosed in U.S. Pat. No. 5,693,426, may also be used. B2 structures usable in the primary base layer 2 include NiAl, AlCo, FeAl, FeTi, CoFe, CoHf, CoZr, NiTi, CuBe, CuZn, AlMn, AlRe, AgMg and $Al_2FeMn_2$. However, it is preferable to use a primary base layer 2 with CrMo. It is also preferable that the primary base layer 2 have a thickness of 3 nm or more for creating a high level of magnetic retention in the medium and for increasing the in-plane orientation of the magnetic layer 5.

The soft magnetic layer 3 has a high level of magnetic permeability which reduces the reverse magnetic field of the bit boundary and thermally stabilizes the magnetization when the recorded mirror image of the bit pattern is formed onto the magnetic layer 5. FeAlSi or CoTaZr are used to form the soft magnetic layer 3, and the thickness of the soft magnetic layer 3 should be from 0.5 nm to 5.5 nm in order to increase the S/N ratio of the medium. In the alternative, the product of the layer thickness and saturation magnetic flux density should be 5 G·μm to 60 G·μm.

The secondary base layer or second control layer 4 has the same preferred components as the control layer 2. As with the control layer 2, control layer 4 also preferably includes CrMo. The secondary base layer 4 should also be 1 nm thick or more.

The primary base layer 2, softmagnetic layer 3 and secondary base layer 4 all may be formed by sputtering using a magnetron sputtering method at a temperature of 200° C., under Ar gas pressure of 1 mTorr to 10 mTorr, and at 100 V DC to 500 V DC bias voltage. Other methods for forming this layer, without the use of magnetron sputtering, can be employed, such as a deposition method and an ion beam sputtering method.

The magnetic layer 5 is made of an optional magnetic metal (alloy) with the circumferential direction as the direction of easy magnetization and Co as the main component. More specifically, it is formed of, for example, components such as a CoNi alloy or a CoCr alloy. However, the CoCr alloy is preferred. Further, the magnetic layer may be formed of a three-component alloy that adds, for example, Pt, Ta, or Nb to the two-component alloys already described. In the alternative, the magnetic layers may also be formed of a four-component alloy or a five-component alloy. The preferred thickness of the magnetic layer 5 is from 10 nm to 25 nm.

As with the other layers described above, the magnetic layer 5 can be formed using the magnetron sputtering method. The magnetic layer 5 is preferably formed at a temperature of 150° C. to 300° C., with an Ar gas pressure of 1 mTorr to 10 mTorr and a negative DC bias of from 80 V to 400 V. Other film forming methods such as deposition or ion beam sputtering as known in the art may also be used.

The protective layer 6 may be formed of a simple carbon or a carbon compound. For example, the protective layer 6 may be formed of WC, SiC, $B_4C$, carbon containing hydrogen, or diamond like carbon (DLC), which has the advantage of being very hard. The thickness of the protective layer 6 will depend on a variety of factors and may be set within a broad range. However, it is preferred that this thickness be between 5 nm and 20 nm.

The protective layer 6 is preferably formed using a method such as magnetron sputtering, and at a film forming temperature of 20° C. to 100° C. under an Ar gas pressure of 1 mTorr to 10 mTorr. This layer, however, can also be formed by deposition or ion beam sputtering methods.

In another aspect of the present invention, a lubricating film 7 may be formed on top of the protective layer 6, if it is required. This will depend on the type of magnetic head that is used in the disk drive. The lubricating film 7 is formed by immersing the medium 1 in a solution containing fluorocarbon resin material. It is preferable to form a fluorocarbon resin layer as the lubricating film 7 at a thickness of 2 nm to 5 nm. Forming the thickness of the lubricating film depends on the concentration of the substance in the solution and the speed at which the medium is removed from the solution.

Figure 2:
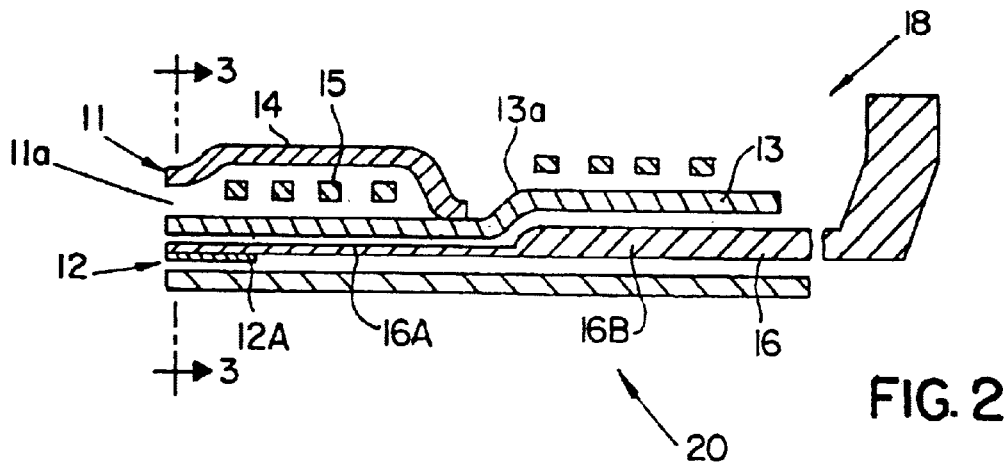
FIG. 2 is a side cross-sectional view of the magnetic head in a disk drive unit used with the magnetic disk of the present invention.
Figure 3:
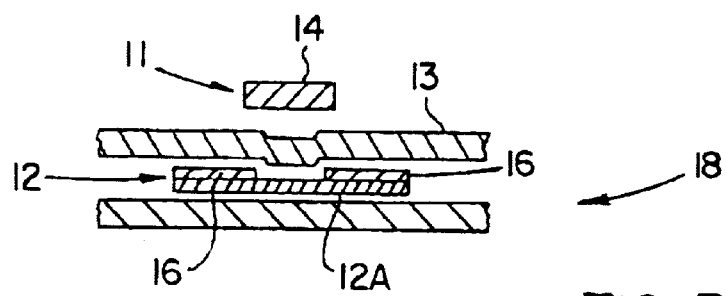
FIG. 3 is a cross-sectional view taken along line 3—3 in FIG. 2.

Referring now to FIGS. 2–3, a magnetic disk drive unit 20 has a magnetic head 18 that writes data to, and reads data from, a magnetic disk 50 (head 18 is the only part of the drive unit 20 that is shown). As shown in both FIGS. 2 and 3, the magnetic head 18 has an induction writing head 11 that records data and a magnetic resistance effect reading head 12 that reads data.

The write head 11 includes a lower magnetic pole 13 composed of NiFe, and an NiFe upper magnetic pole 14 that opposes the lower magnetic pole 13. The upper pole 14 is set at a constant interval from the lower magnetic pole 13. Coils 15 excite the lower magnetic pole 13 and the upper magnetic pole 14, which causes the writing of data on the magnetic recording medium near the writing gap section 11a of the write head 11.

Referring now to FIG. 3, the read head 12 is preferably either an MR head or a GMR head. A pair of conductance layers 16 supply sense current to the magnetic resistance effect element 12A. The layers 16 are installed on the magnetic resistance effect element 12A of the read head 12 at an interval that corresponds to the width of the write track (not shown). In general, the sense current that flows to the magnetic resistance effect element 12A is 3 mA to 15 mA.

As best seen on FIG. 2, a portion 16A of the conductance layer 16 is thin, while a portion 16B is thick. Since the thickness of the conductance layer 16 is thinner at 16A, which is near the magnetic resistance effect element 12A, it is possible to provide a smaller bend 13a of the lower magnetic pole 13 which allows for a reduced curving shape of the recording gap that opposes the recording media. Therefore, even if there is a slight offset between the position of the magnetic head 18 when it writes data and the position of the magnetic head 18 when it reads data, the magnetic disk drive unit 20 will be able to read data accurately. For this reason, in spite of the fact that the allowable amount of off-track is small, read errors are still avoided.

On the other hand, the thicker portion 166B allows the overall resistance of the conductance layer 16 to be decreased. This enables detection of changes in the resistance at the magnetic resistance effect element 12A to a high degree of sensitivity, increase in the S/N ratio, and avoidance of over heating the conductance layer 16, which in turn avoids generating noise due to heat.

A magnetic head 18 with the magnetic resistance effect element 12A can be fabricated by forming a plurality of such heads on a ceramic head substrate using known thin film technology. The head substrate is then sliced to expose each head, and the heads are then formed to designated shapes.

Referring now to FIGS. 4–5, a magnetic disk drive unit 22, similar to disk drive unit 20, preferably has three magnetic disks 50 stacked on, and driven by, a spindle motor 52 located on top of the base plate 51. The actuator 53 is rotatably supported on top of the base plate 51. A plurality of head arms 54 that extend in a parallel direction to the recording surface of the magnetic disk 50 have been formed on one end of the actuator 53. A spring arm 55 is attached to one end of each of the head arms 54. A slider 40 is attached to the flexure portion of each spring arm 55 through an insulating layer (not shown).

A magnetic circuit 58 consisting of a permanent magnet and a yoke are attached to the base plate 51. Coils 57 attached to an end of the actuator 53 are positioned within the magnetic gap of the magnetic circuit 58. The voice coil motor (VCM) consists of the magnetic circuit 58 and the coils 57. Finally, the top of the base plate 51 is covered by a cover 59.

In operation, when the magnetic disks 50 are in the stopped condition, the sliders 40 are stopped but make contact with the magnetic disks 50 at standby zones (not shown). When the magnetic disks 50 are rotated by the spindle motor 52, the air flow generated by the rotating magnetic disks causes the sliders 40 to float at a small distance above the surfaces of the disks. If current flows to the coil 57 while the sliders are floating above the disk, thrust is generated at the coil 57 causing the actuator 53 to rotate. The sliders 40 will then move to the designated track of the magnetic disk 10 and read or write data.

EXPERIMENTAL DATA

Figure 6:
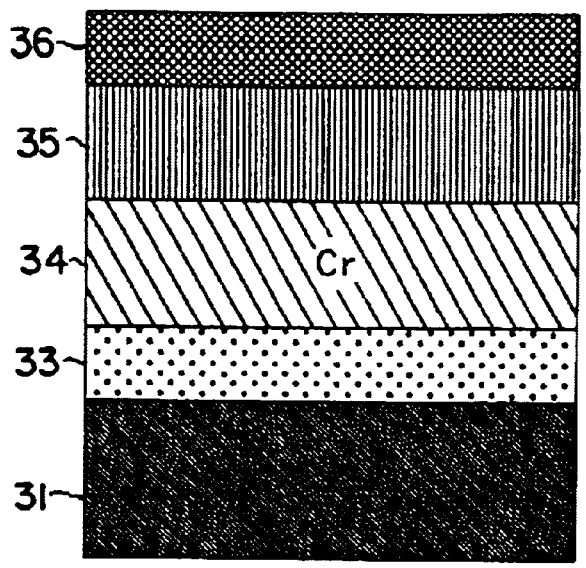
FIG. 6 is a cross sectional view of another magnetic disk used for comparison to the magnetic disk of the present invention.

Referring now to FIGS. 1 and 6, the magnetized disk 10 is designated disk "A" with the layers as shown in FIG. 1, except without lubricant layer 7. Disk A was formed by first texture treating a surface of an aluminum disk, i.e. the substrate 1 coated with a non-electrolytic NiP. After this, as shown in FIG. 1, the CrMo primary base layer 2, the FeAlSi soft magnetic layer 3, the CrMo secondary base layer 4, the CoCrPta magnetic layer 5, and the C protective layer 6 were formed in sequence to create magnetic disk A.

For comparison, a magnetic disk "B" of FIG. 6 has a NiP film formed on an aluminum disk 31. On top of this film, the following layers were formed in the following sequence from bottom to top: an FeAlSi soft magnetic layer 33, a CrMo secondary base layer 34, a CoCrPtTa magnetic layer 35, and a Carbon protective layer 36.

The magnetron sputtering method was used to form the layers of magnetic disk A and magnetic disk B. Before the layers were formed, the sputter chamber was exhausted to at or below $3 \times 10^{-7}$ Torr. After this, argon gas was introduced into the sputtering chamber, and was maintained at $5 \times 10^{-6}$ Torr. Film formation took place at a substrate temperature of 200° C. In the case of magnetic disk A, a plurality of samples were fabricated with varying layer thicknesses for the CrMo primary base layer 2, the FeAlSi soft magnetic layer 3, and the CrMo secondary base layer 4.

Figure 7:
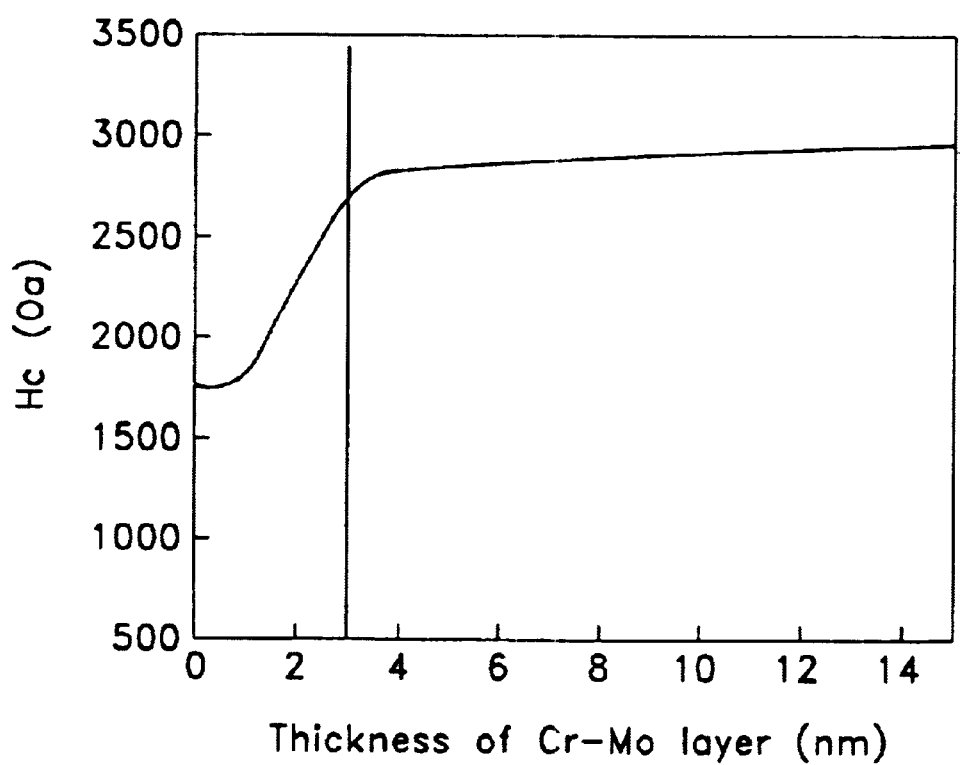
FIG. 7 is a graph indicating the relationship between thickness of a primary base layer and in-plane coercivity in a magnetic disk of the present invention.

Referring now to FIG. 7, the layer thickness dependency of the CrMo primary base layer 2 to in-plane coercivity (Hc) was measured for magnetic disk A. In addition, the Hc of magnetic disk B was also measured to verify Hc when no CrMo primary base layer 2 exists. To measure Hc, an in-plane Kerr effect measuring instrument (R01700) produced by Hitachi Electronics was used. The results of the measurement are shown in FIG. 7.

As shown, by forming the FeAlSi soft magnetic layer 3 on the CrMo primary base layer 2, the in-plane orientation improved, resulting in a large Hc. In addition, FIG. 7 reveals that even better properties can be obtained with a CrMo primary base layer 2 with a thickness set to 3 nm or higher as evidenced by the gradual steady slope of the graph.

Figure 8:
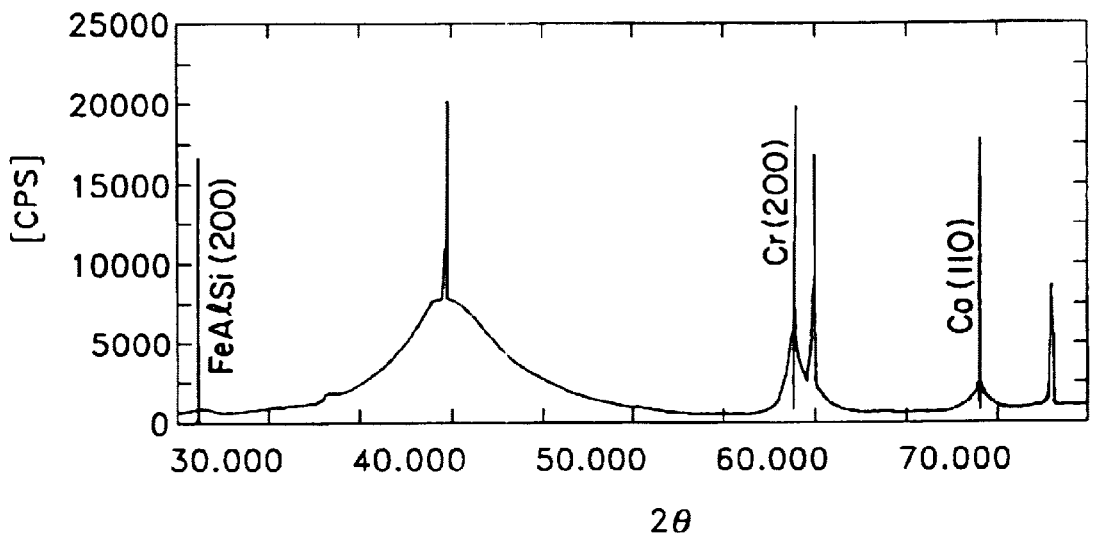
FIG. 8 is a graph of the x-ray analysis profile of a magnetic disk of the present invention.
Figure 9:
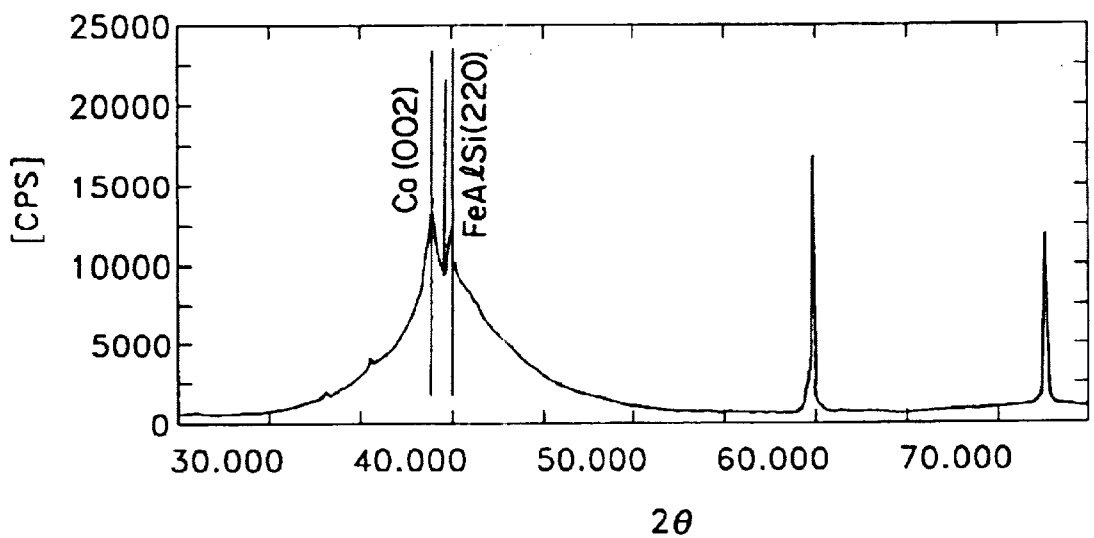
FIG. 9 is a graph of the x-ray analysis profile of the magnetic disk used for comparison to the magnetic disk of the present invention.

Referring now to FIGS. 8–9, an x-ray analysis profile of magnetic disks A and B reveals the magnetic orientation of the layers. For this analysis, disk A included a CrMo primary base layer 2 with a thickness of 20 nm, an FeAlSi soft magnetic layer 3 with a thickness of 22 nm, a CrMo secondary base layer 4 with a thickness of 30 nm, and a CoCrPtTaPt magnetic layer 5 with a thickness of 22 nm. Disk B included the same layers except without the CrMo primary base layer 2. An XRD system produced by Rigaku was used to make the x-ray analysis.

As shown in FIG. 8, for magnetic disk A, a Co (100) surface was observed, indicating the in-plane orientation was good. Also, an FeAlSi (200) surface that was parallel to the FeAlSi (100) surface was also observed. However, as shown in FIG. 9, disk B exhibited a Co (002) surface indicating the in-plane orientation had deteriorated.

FIG. 8 shows that forming the easily (100) oriented CrMo primary base layer 2 on an aluminum disk 1 plated with NiP allowed the orientation surface of the FeAlSi soft magnetic layer 3 to be controlled to (100). Further, the surface of the CrMo secondary base layer 4 on top of layer 3 was also (100) oriented. Thus, the in-plane orientation of the C axis of the CoCrPtTa magnetic layer 5 was improved. In this case, the inter planer spacing of the (110) plane in the secondary base layer 4 and the inter planer spacing of the (002) plane in the Co type magnetic layer 5 were nearly equal in terms of crystalline structure and the lattice coefficients of the primary base layer 2, the soft magnetic layer 3, and the secondary base layer 4 were nearly equal.

By having a CrMo primary base layer 2 with a thickness of 3 nm or more, optimal properties can be obtained including a higher S/N ratio. It will be appreciated that instead of using Cr alloy as the material for the primary base layer 2, the same effects can be obtained using NiAl, which has a structure that is close to Cr in terms of its crystalline properties. Also, instead of using FeAlSi as the material for the soft magnetic layer, it is believed that the same results can be obtained using an FeNi soft magnetic layer.

Figure 10:
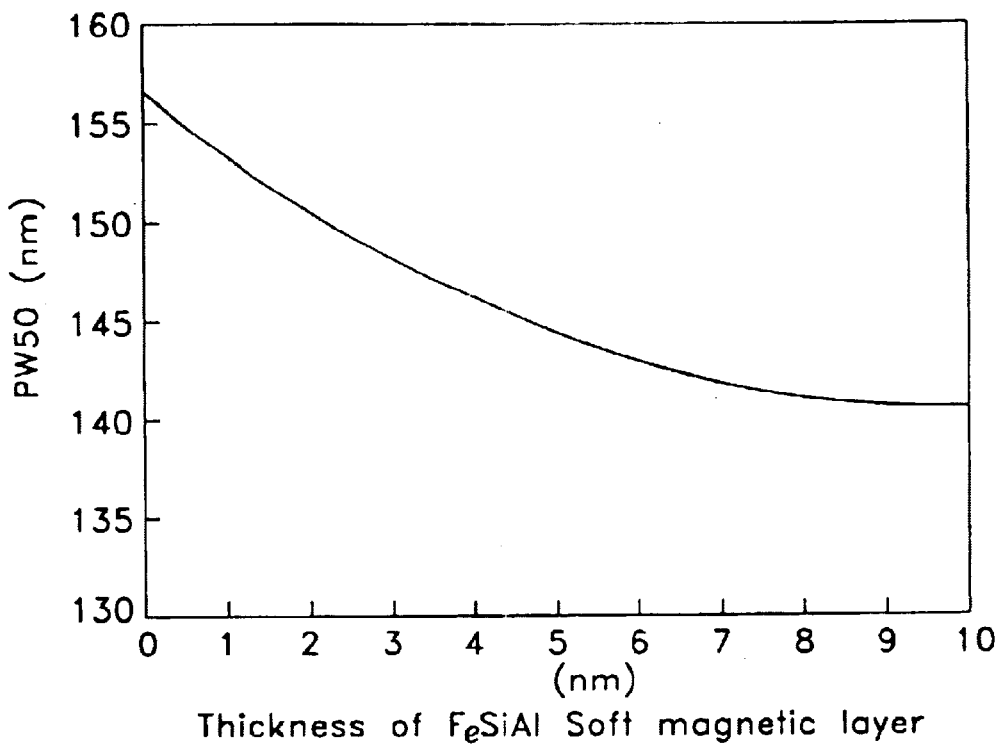
FIG. 10 is a graph indicating the relationship between the thickness of a soft magnetic layer and pulse width 50 for the magnetic disk of the present invention.

FIG. 10 is a graph that indicates the relationship between Pw 50 and the thickness of the FeAlSi soft magnetic layer 3 for magnetic disk A. It is clear from this graph that the thicker the soft magnetic layer 3 is, the more Pw 50 decreases. The narrower the pulse width, the better the conditions for high density recording. As previously stated, the reason that Pw 50 decreases is believed to be because the FeAlSi soft magnetic layer causes the reverse magnetic field at the bit boundary to decrease.

Figure 11:
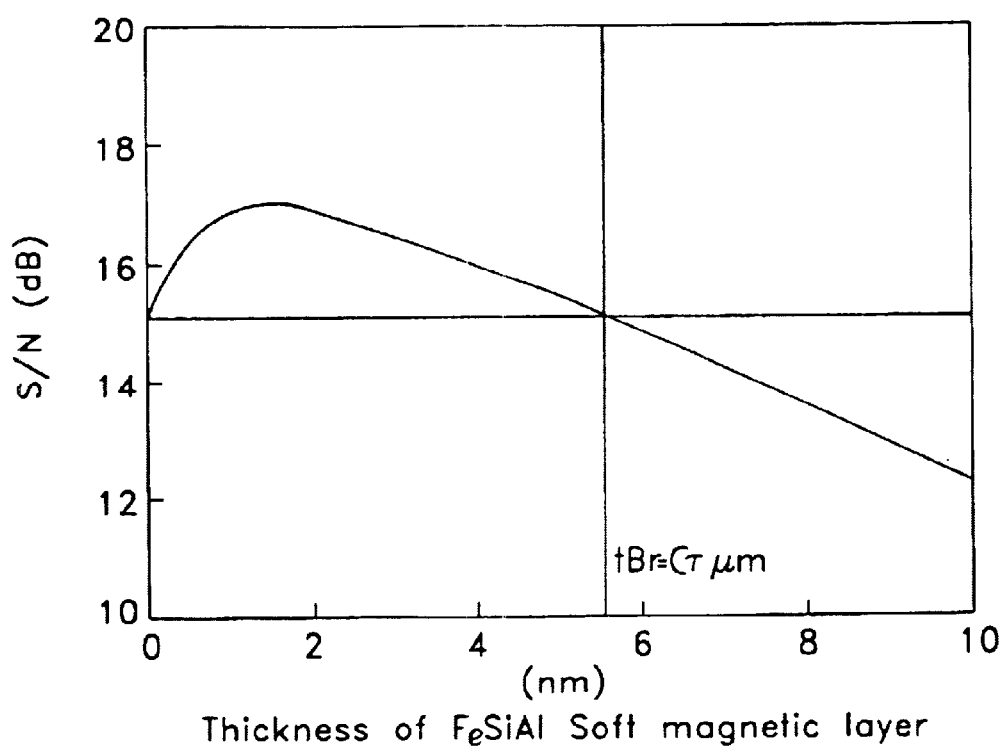
FIG. 11 is a graph indicating the relationship between the thickness of a soft magnetic layer and S/N ratios for a magnetic disk of the present invention.

FIG. 11 is a graph of the relationship between the S/N ratio and the FeAlSi soft magnetic layer 3 for magnetic disk A. From FIG. 11, it can be understood that when the thickness (t) of the soft magnetic layer 3 is 0.5 nm to 5.5 nm, or when the product of t and Bs (the saturation flux density) of the soft magnetic layer 3 is 5 G·μm to 60 G·μm, a S/N ratio above 15 dB can be obtained. The value is equivalent to 10 percent to 85 percent of the product tBr, where t is the thickness of the CoCrPtTaPt magnetic layer 5 and Br is the saturation remanent magnetization density.

Figure 12:
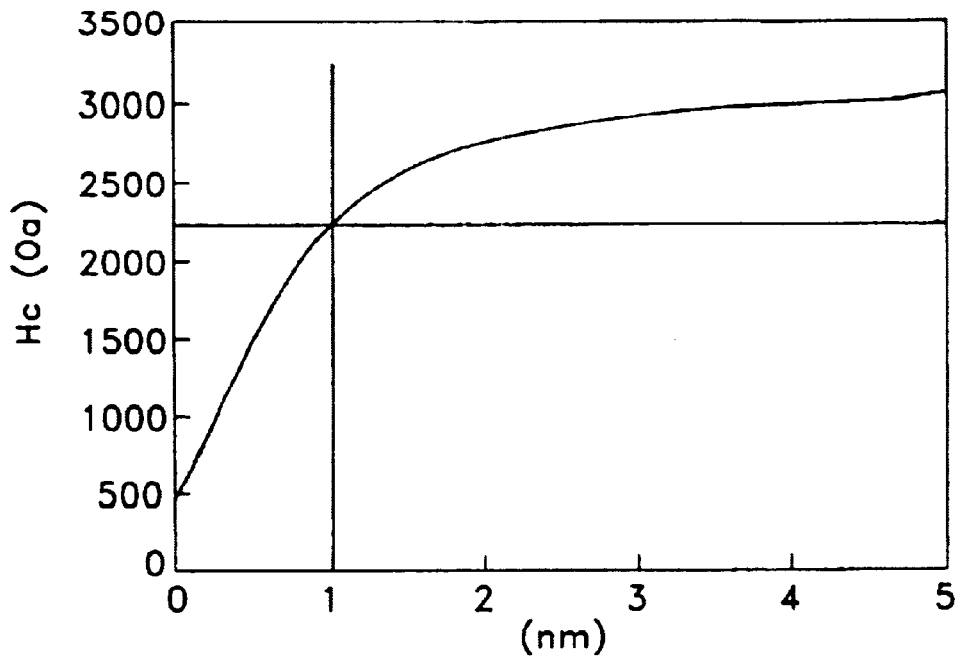
FIG. 12 is a graph of the relationship between in-plane coercivity and the thickness of a secondary base layer of a magnetic disk of the present invention.

FIG. 12 is a graph indicating the relationship between the thickness of the CrMo secondary base layer 4 and the Hc of magnetic disk A. Based on FIG. 12, as the thickness of the CrMo secondary base layer 4 increases, Hc also increases. In the range of 1 nm or higher, the increase in Hc becomes more gradual. Based on this result, it is desirable for the thickness of the CrMo secondary base layer to be 1 nm or higher.

Figure 13:
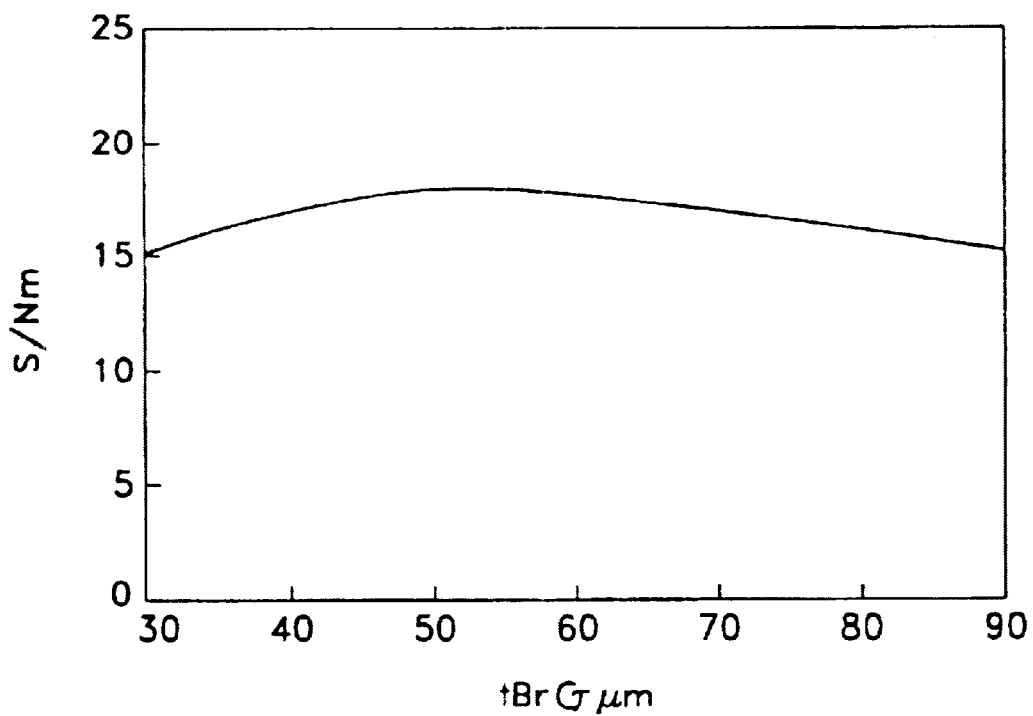
FIG. 13 is a graph of the relationship between tBr and S/Nm ratios for the magnetic disk of the present invention.

FIG. 13 is a graph indicating the relationship between tBr and S/Nm for the CoCrPtTa magnetic layer 5 of magnetic disk A. If the magnetic heads must be either MR heads or GMR heads, an S/Nm of 15 dB or higher is required for satisfactory reproduction. To satisfy this requirement, it is desirable that tBr be within the range of 30 G·μm to 90 G·μm. Also, a high S/Nm can be obtained by setting the substrate temperature to between 160° C. and 300° C. when forming the CoCrPtTa magnetic layer 5 using a sputtering method.

In further experiments, soft magnetic layer 3 was made of CoTaZr to form a magnetic disk C instead of FeAlSi as was used for magnetic disk A. For comparison to disk C, magnetic disk D was formed similar to disk B except that FeAlSi was replaced with CoTaZr in the soft magnetic layer 33. The magnetron sputtering method was used to form the layers on magnetic disks C and D. Before the layers were formed, the sputter chamber was exhausted to at or below 3×10⁻⁷ Torr. After this, argon gas was introduced in the sputter chamber, and this chamber was maintained at 5×10⁻⁶ Torr. Film formation took place at a substrate temperature of 200° C. In the case of magnetic disk C, a plurality of samples were fabricated with varying layer thicknesses for the CrMo primary base layer 2.

Figure 14:
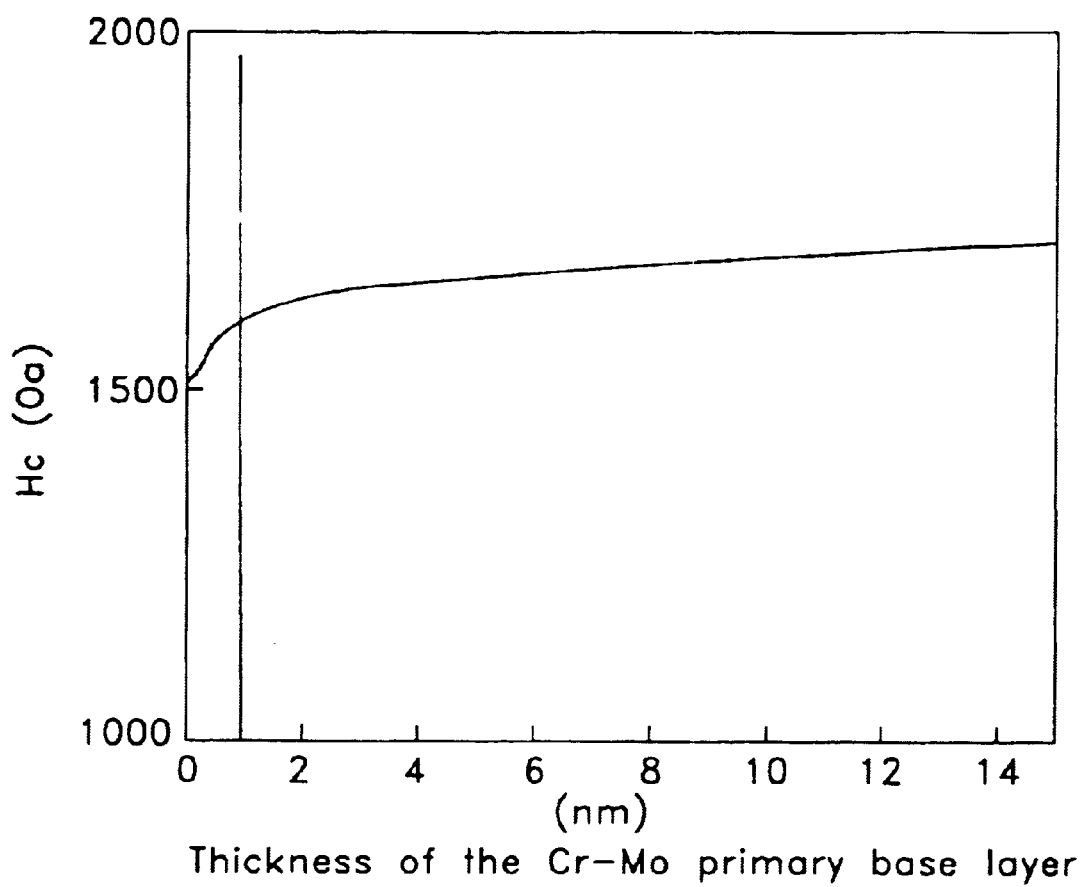
FIG. 14 is a graph of the relationship between in-plane coercivity and the thickness of a primary base layer of the magnetic disk of the present invention.

Referring now to FIG. 14, the relationship between the layer thickness of the CrMo primary base layer 2 and the in-plane coercivity (Hc) was measured and recorded for magnetic disk C. In addition, the Hc of magnetic disk D was also measured to verify the Hc when the thickness of the CrMo primary base layer 2 is zero. To measure Hc, an in-plane Kerr effect measuring instrument (R01700) produced by Hitachi Electronics was used. As shown in FIG. 14, by forming the FeAlSi soft magnetic layer 3 on the CrMo primary base layer 2, the in-surface orientation improved, resulting in a large Hc. In addition, this is further improved by using a CrMo primary base layer 2 with a thickness of 1 nm or higher.

It will now be appreciated that the magnetic disk medium of the present invention has many advantageous features. The present disk medium includes a soft magnetic layer disposed between two layers of control layers, the bottom layer of which is formed on a non-magnetic substrate. A magnetic layer is formed on the top layer of the two control layers. This structure allows for good in-plane orientation and high coercivity for the magnetic layer. Further, a high S/N ratio can be obtained, and high recording densities are promoted for the magnetic recording medium.

Although preferred embodiments of the present invention were described above, the present invention is not limited to these specific embodiments. Various modifications are possible within the scope of the present invention as described in the appended claims.

What is claimed is:

1. A magnetic recording medium, comprising:
   a non-magnetic substrate;
   a first non-magnetic control layer disposed above said substrate;
   a soft magnetic layer disposed above said first control layer;
   a second non-magnetic control layer disposed above said soft magnetic layer;
   a primary magnetic layer disposed above said second control layer; and
   a protective layer disposed above said primary magnetic layer;
   wherein said first control layer increases (100) plane orientation of said second control layer and said second control layer increases an in-plane orientation of said primary magnetic layer,
   wherein said substrate is texture treated with NiP plating in the circumferential direction of said substrate.

2. A magnetic recording medium, comprising:
   a non-magnetic substrate;
   a first non-magnetic control layer disposed above said substrate;
   a soft magnetic layer disposed above said first control layer;
   a second non-magnetic control layer disposed above said soft magnetic layer;
   a primary magnetic layer disposed above said second control layer; and
   a protective layer disposed above said primary magnetic layer;
   wherein said first control layer increases (100) plane orientation of said second control layer and said second control layer increases an in-plane orientation of said primary magnetic layer,
   wherein said first control layer and said second control layer include at least chromium.

3. The magnetic recording medium according to claim 2, wherein said first and said second control layers include one of CrW, CrV, CrTi and CrMo.

4. The magnetic recording medium according to claim 3, wherein said first control layer has a thickness of approximately 3 nm or greater.

5. The magnetic recording medium according to claim 3, wherein said second control layer has a thickness of approximately 1 nm or greater.

6. A magnetic recording medium, comprising:
   a non-magnetic substrate;
   a first non-magnetic control layer disposed above, said substrate;

a soft magnetic layer disposed above said first control layer;

a second non-magnetic control layer disposed above said soft magnetic layer;

a primary magnetic layer disposed above said second control layer; and a protective layer disposed above said primary magnetic layer;

wherein said first control layer increases (100) plane orientation of said second control layer and said second control layer increases an in-plane orientation of said primary magnetic layer, wherein said first and said second control layers include one of NiAl, AlCo, FeAl, FeTi, CoFe, CoHf, CoZr, NiTi, CuBe, CuZn, AlMn, AlRe, AgMg and $Al_2FeMn_2$.

7. A magnetic recording medium, comprising:

a non-magnetic substrate;

a first non-magnetic control layer disposed above said substrate;

a soft magnetic layer disposed above said first control layer;

a second non-magnetic control layer disposed above said soft magnetic layer;

a primary magnetic layer disposed above said second control layer; and a protective layer disposed above said primary magnetic layer;

wherein said first control layer increases (100) plane orientation of said second control layer and said second control layer increases an in-plane orientation of said primary magnetic layer, wherein said soft magnetic layer includes one of FeAlSi and CoTaZr.

8. The magnetic recording medium according to claim 7, wherein said soft magnetic layer has a thickness of approximately 0.5 nm to 5.5 nm.

9. The magnetic recording medium according to claim 7, wherein a product of thickness and saturation magnetic flux density of said soft magnetic layer is approximately 5 G·$\mu$m to 60 G·$\mu$m.

10. The magnetic recording medium according to claim 1, wherein said primary magnetic layer includes one of CoCr and CoNi.

11. The magnetic recording medium according to claim 10, wherein said primary magnetic layer has a thickness from approximately 10 nm to 25 nm.

12. The magnetic recording medium according to claim 10, wherein said primary magnetic layer further includes one of Pt, Ta and Tb.

13. The magnetic recording medium according to claim 1, wherein said protective layer is formed from one of WC, SiC, $B_4C$, carbon containing hydrogen and diamond like carbon.

14. The magnetic recording includes according to claim 13, wherein said protective layer has a thickness of approximately 5 nm to 20 nm.

15. The magnetic recording medium recording to claim 1, further including a lubricating layer disposed above said protective layer.

16. A magnetic disk drive apparatus, comprising:

at least one magnetic recording medium, including:

a non-magnetic substrate wherein said substrate is texture treated with NiP plating in the circumferential direction of said substrate;

a first non-magnetic control layer disposed above said substrate;

a soft magnetic layer disposed above said first control layer;

a second non-magnetic control layer disposed above said soft magnetic layer;

a primary magnetic layer disposed above said second control layer; and a protective layer disposed above said primary magnetic layer;

wherein said first control layer increases (100) plane orientation of said second control layer and said second control layer increases an in-plane orientation of said primary magnetic layer;

at least one magnetic head corresponding to Said at least one magnetic recording medium for reading data from and writing data to said magnetic recording medium; and an actuator having at least one arm corresponding to said at least one magnetic head for supporting and moving said magnetic head above said magnetic recording medium.

17. The magnetic recording medium according to claim 2, wherein said primary magnetic layer includes one of CoCr and CoNi.

18. The magnetic recording medium according to claim 6, wherein said primary magnetic layer includes one of CoCr and CoNi.

19. The magnetic recording medium according to claim 7, wherein said primary magnetic layer includes one of CoCr and CoNi.

20. The magnetic recording medium according to claim 17, wherein said primary magnetic layer further includes one of Pt, Ta and Tb.

21. The magnetic recording medium according to claim 18, wherein said primary magnetic layer further includes one of Pt, Ta and Tb.

22. The magnetic recording medium according to claim 19, wherein said primary magnetic layer further includes one of Pt, Ta and Tb.

23. A magnetic disk drive apparatus, comprising:

at least one magnetic recording medium, including:

a non-magnetic substrate;

a first non-magnetic control layer disposes above said substrate;

a soft magnetic layer disposed above said first control layer;

a second non-magnetic control layer disposed above said soft magnetic layer;

a primary magnetic layer disposed above said second control layer; and a protective layer disposed above said primary magnetic layer;

wherein said first control layer increases (100) plane orientation of said second control layer and said second control layer increases an in-plane orientation of said primary magnetic layer and further wherein said first control layer and said second control layer include at least chromium;

at least one magnetic head corresponding to said at least one magnetic recording medium for reading data from and writing data to said magnetic recording medium; and an actuator having at least one arm corresponding to said at least one magnetic head for supporting and moving said magnetic head above said magnetic recording medium.

24. A magnetic disk drive apparatus, comprising:
at least one magnetic recording medium, including:
- a non-magnetic substrate;
- a first non-magnetic control layer disposed above said substrate;
- a soft magnetic layer disposed above said first control layer;
- a second non-magnetic control layer disposed above said soft magnetic layer;
- a primary magnetic layer disposed above said second control layer; and
- a protective layer disposed above said primary magnetic layer;
- wherein said first control layer increases (100) plane orientation of said second control layer and said second control layer increases an in-plane orientation of said primary magnetic layer, and further wherein said first and said second control layers include one of NiAl, AlCo, FeAl, FeTi, CoFe CoHf, CoZr, NiTi, CuBe, CuZn, AlMn, AlRe, AgMg and $Al_2FeMn_2$;
- at least one magnetic head corresponding to said at least one magnetic recording medium for reading data from and writing data to said magnetic recording medium; and
- an actuator having at least one arm corresponding to said at least one magnetic head for supporting and moving said magnetic head above said magnetic recording medium.

25. A magnetic disk drive apparatus, comprising:
at least one magnetic recording medium, including:
- a non-magnetic substrate;
- a first non-magnetic control layer disposed above said substrate;
- a soft magnetic layer disposed above said First control layer, wherein said soft magnetic layer includes one of FeAlSi and CoTaZr;
- a second non-magnetic control layer disposed above said soft magnetic layer;
- a primary magnetic layer disposed above said second control layer; and
- a protective layer disposed above said primary magnetic layer;

wherein said first control layer increases (100) plane orientation of said second control layer and said second control layer increases an in-plane orientation of said primary magnetic layer;

at least one magnetic head corresponding to said at least one magnetic recording medium for reading data from and writing data to said magnetic recording medium; and an actuator having at least one arm corresponding to said at least one magnetic head for supporting and moving said magnetic head above said magnetic recording medium.

\* \* \* \* \*

UNITED STATES PATENT AND TRADEMARK OFFICE
CERTIFICATE OF CORRECTION

PATENT NO. : 6,686,069 B1
DATED : February 3, 2004
INVENTOR(S) : Okuyama et al.

It is certified that error appears in the above-identified patent and that said Letters Patent is hereby corrected as shown below:

Column 8,
Line 66, delete "above, said" and insert -- above said --.

Column 9,
Line 56, delete "includes" and insert -- medium --.
Line 60, delete "recording" and insert -- according --. (second occurrence).

Column 10,
Line 15, delete "Said" and insert -- said --.

Column 11,
Line 19, delete "CoFe CoHf" and insert -- CoFe, CoHf --.

Column 12,
Line 6, delete "First" and insert -- first --.

Signed and Sealed this

Seventeenth Day of August, 2004

JON W. DUDAS
*Acting Director of the United States Patent and Trademark Office*